(12) United States Patent
Xu et al.

(10) Patent No.: US 11,111,561 B2
(45) Date of Patent: Sep. 7, 2021

(54) PREPARATION METHOD AND USE OF THICKNESS-CONTROLLABLE BISMUTH NANOSHEET AND BISMUTH ALLOY NANOSHEET

(71) Applicant: Changchun Institute of Applied Chemistry Chinese Academy of Sciences, Jilin (CN)

(72) Inventors: Weilin Xu, Changchun (CN); Fa Yang, Changchun (CN); Mingbo Ruan, Changchun (CN); Yuwei Zhang, Changchun (CN); Ping Song, Changchun (CN)

(73) Assignee: Changchun Institute of Applied Chemistry Chinese Academy of Sciences, Changchun (CN)

( * ) Notice: Subject to any disclaimer, the term of this patent is extended or adjusted under 35 U.S.C. 154(b) by 248 days.

(21) Appl. No.: 16/108,688

(22) Filed: Aug. 22, 2018

(65) Prior Publication Data

US 2019/0284663 A1    Sep. 19, 2019

(30) Foreign Application Priority Data

Mar. 13, 2018  (CN) .......................... 201810204740.5

(51) Int. Cl.
*C22C 12/00*   (2006.01)
*B82Y 30/00*   (2011.01)
(Continued)

(52) U.S. Cl.
CPC .............. *C22C 12/00* (2013.01); *B82Y 30/00* (2013.01); *B82Y 40/00* (2013.01); *C25B 3/25* (2021.01)

(58) Field of Classification Search
CPC ................................. C22C 12/00; B82Y 40/00
See application file for complete search history.

(56) References Cited

U.S. PATENT DOCUMENTS

2014/0242389 A1* 8/2014 Mahler ................. B82Y 40/00
                                                                    428/403
2016/0163411 A1* 6/2016 Kim ..................... C01B 32/194
                                                                    252/503

FOREIGN PATENT DOCUMENTS

CN      101785999          7/2010
CN      101785999 A *     7/2010
(Continued)

OTHER PUBLICATIONS

Kumar P. et al.; "Rational low temperature synthesis and structural investigations of ultrathin bismuth nanosheets", RSC Advances, 2013, 3, 2313 (Year: 2013).*
(Continued)

*Primary Examiner* — Alexandra M Moore
*Assistant Examiner* — Austin Pollock
(74) *Attorney, Agent, or Firm* — Fish & Richardson P.C.

(57) ABSTRACT

The present disclosure relates to a preparation method and use of a thickness-controllable bismuth nanosheet and its alloy, in order to solve the technical problems that the existing metal catalysts for the conversion of carbon dioxide to formic acid exhibit a low efficiency, a high overpotential, a relatively positive hydrogen evolution potential, and a poor stability. In the present disclosure, a bismuth nanosheet of a single atom layer thickness with a thickness of only 0.7 nm is obtained through an aqueous solution reduction method by using a bismuth salt compound as a raw material, using ethylene glycol ethyl ether as a solvent, and using a highly reductive aqueous solution containing $NaBH_4$, $LiBH_4$ or the like as a reducing agent, under a protection atmosphere of an inert gas.

7 Claims, 6 Drawing Sheets

(51) Int. Cl.
    B82Y 40/00    (2011.01)
    C25B 3/25     (2021.01)

(56) References Cited

FOREIGN PATENT DOCUMENTS

| CN | 104400004 | | 3/2015 |
| CN | 104805463 | A * | 7/2015 |
| CN | 105018909 | | 11/2015 |
| CN | 105460974 | A * | 4/2016 |
| CN | 106622303 | A * | 5/2017 |
| CN | 107020075 | | 8/2017 |
| CN | 108212141 | A * | 6/2018 |
| CN | 108372306 | A * | 8/2018 |

OTHER PUBLICATIONS

Su P. et al.; "Ultrathin Bismuth Nanosheets as a Highly Efficient CO2 Reduction Electrocatalyst", Jan. 2018, 11, 848-853 (Year: 2018).*

Hu X., et al.; "Graphene oxide-assisted synthesis of bismuth nanosheets for catlytic stripping voltammetric determination of iron in coastal water", Microchim Acta, 2016, 183, 855-861 (Year: 2016).*

Jeon S., et al.; "Selective Synthesis of Nanospheres and Nanosheets of Bismuth Subcarbonate", Chem. Lett., 2015, 44, 1717-1719 (Year: 2015).*

Hussain N., et al.; "Ultrathin Bi Nanosheets with Superior Photoluminescence", small journal, 2017, 13 (Year: 2017).*

Zhang M.; et al. "Synthesis of Bismuth Nanoparticles by a Simple Solvothermal Reduction Route", Applied Mechanics and Materials, vols. 423-426, pp. 155-158 (Year: 2013).*

Kim et al., "Shape-controlled bismuth nanoflakes as highly selective catalysts for electrochemical carbon dioxide reduction to formate," Nano Energy, Sep. 1, 2017, 39:44-52.

Han et al., "Ultrathin bismuth nanosheets from in situ topotactic transformation for selective electrocatalytic CO2 reduction to formate," Nature Communication, Apr. 3, 2018, 9(1):1320, 8 pages.

Office Action issued in Chinese Application No. 201810204740.5, dated Mar. 26, 2019, 14 pages with English translation.

Office Action issued in Japanese Application No. 2018193284, dated Nov. 19, 2019, 8 pages with English translation.

* cited by examiner

PREPARATION METHOD AND USE OF THICKNESS-CONTROLLABLE BISMUTH NANOSHEET AND BISMUTH ALLOY NANOSHEET

CROSS-REFERENCE TO RELATED APPLICATION

The present application claims priority to Chinese Application No. 201810204740.5, filed on Mar. 13, 2018, the contents of which are hereby incorporated by reference in their entirety.

TECHNICAL FIELD

The present disclosure relates to a preparation method of a nanomaterial, and particularly to a preparation method and use of a thickness-controllable bismuth nanosheet and bismuth alloy nanosheet.

BACKGROUND

Since the industrial revolution, human demand and utilization for energy are increasing. Meanwhile, the energy and environmental problems caused by the burning of mass fossil fuels are also growing. The accumulation of $CO_2$ concentration in the atmosphere not only leads to the occurrence of greenhouse effect, but also is a waste of resources. The absorption and conversion of $CO_2$ emitted to the atmosphere into usable energy substances not only reduce the net content of $CO_2$ emitted by human activities to the atmosphere, but also partially solve the problem of energy exhaustion caused by the depletion of fossil fuels. The electrocatalytic reduction of $CO_2$ can utilize clean and renewable energy sources such as solar energy, wind energy and the like to provide electric energy. It is an efficient way for storing electric power to convent $CO_2$ into substances such as CO, alkanes, formic acid, alcohols and the like so as to transform the electric power into these fuels with high energy densities.

In the current situation, the electrocatalytic reduction of carbon dioxide still has many problems to be solved mainly in the following aspects: (1) since the reduction reaction of $CO_2$ often needs to occur at a relative high overpotential and the energy required is very high, it is necessary to find a suitable catalyst to decrease the overpotential of the reaction; (2) due to the large number of products in the reduction reaction of $CO_2$ with the competing side reaction of hydrogen evolution accompanied, it is necessary to find suitable materials and methods to improve the selectivity of the reaction to promote the conversion of more $CO_2$ into the products required; and (3) since the catalyst is easily deactivated during the reaction, the stability of the catalyst is a key factor which limits its practical application.

During most electrochemical reduction reactions of $CO_2$, it is required to transfer only $2e^-$ to produce CO and formic acid. Because CO is toxic in physical property, and its commercial value is lower than formic acid, researchers pay more attention to the research on formic acid. Formic acid can be used as preservative and antimicrobial in leather tanning, or directly made into a promising formic acid fuel cell, which is a good way to recycle $CO_2$. However, the metal catalysts reported so far for the conversion of carbon dioxide into formic acid still exhibit a quite low efficiency, a very high overpotential, a relatively positive hydrogen evolution potential, and a poor stability.

SUMMARY

To solve the technical problem in the prior art, the present disclosure provides a preparation method and use of a thickness-controllable bismuth nanosheet and bismuth alloy nanosheet.

In order to solve the above technical problem, the specific technical solutions of the present disclosure are as follows.

A method for preparing a thickness-controllable bismuth nanosheet, comprising the steps of:
dissolving a bismuth salt compound as a raw material in ethylene glycol ethyl ether as a solvent, and
performing a reduction through an aqueous solution reduction method to obtain the bismuth nanosheet.

A specific embodiment of the method for preparing a thickness-controllable bismuth nanosheet comprises the steps of:
adding the bismuth salt compound into the ethylene glycol ethyl ether, stirring with sonication to homogenization until a clear solution is obtained,
subsequently stirring the solution at 25-120° C. for 30-60 min, under a protection of an inert gas,
cooling the resultant to ambient temperature,
then adding an aqueous reducing solution dropwise thereto under an inert gas atmosphere, and stirring for another 15-30 min, and
after completion of the reaction, allowing the reaction product to be sonicated, filtered, washed with ethanol and water, collected, and dried, to obtain the bismuth nanosheet.

In the above technical solutions, the bismuth salt compound has an amount of 0.5 mmol-5 mmol, the ethylene glycol ethyl ether has an amount of 200-300 mL, the bismuth salt compound is bismuth chloride or bismuth nitrate, and the aqueous reducing solution used in reduction is an aqueous solution containing $NaBH_4$ or $LiBH_4$ in an amount of 20-40 mmol.

In the above technical solutions, the bismuth nanosheet has a thickness of 0.7 nm-50 nm.

In the above technical solutions, the bismuth nanosheet has a thickness of 0.7 nm-4 nm.

In the above technical solutions, the bismuth nanosheet may also be supported on a carbon-based carrier, wherein the carbon-based carrier is graphene oxide (GO), reduced GO, or carbon back such as BLACK PEARLS® 2000 or VULCAN® XC-72.

A method for preparing a thickness-controllable bismuth alloy nanosheet, comprising the steps of:
dissolving a bismuth salt compound and a palladium, nickel, zinc, gold, or copper salt compound as raw materials in ethylene glycol ethyl ether as a solvent, and
performing a reduction through an aqueous solution reduction method to obtain the bismuth alloy nanosheet.

A specific embodiment of the method for preparing a thickness-controllable bismuth alloy nanosheet comprises the steps of:
dissolving the palladium, nickel, zinc, gold, or copper salt compound in the ethylene glycol ethyl ether, stirring with sonication to homogenization,
subsequently stirring the solution at 25-120° C. for 30-60 min, under a protection atmosphere of an inert gas,
cooling the resultant to ambient temperature, then adding the bismuth salt compound thereto, mixing and stirring the mixture to homogenization,
then adding an aqueous reducing solution dropwise thereto under an inert gas atmosphere, and stirring for another 15-30 min, after completion of the reaction, allowing the reaction product to be filtered, washed with ethanol and water, collected, and dried, placing the dried sample in a tube furnace into which hydrogen gas is injected, and calcinating the sample at 300-600° C. for 1-3 h, to obtain the bismuth alloy nanosheet.

In the above technical solution, the bismuth salt compound is bismuth chloride or bismuth nitrate, with an amount of 0.5 mmol-5 mmol, the ethylene glycol ethyl ether has an amount of 200-300 mL, the palladium, nickel, zinc, gold, or copper salt compound has an amount of 0.5 mmol-5 mmol, and the aqueous reducing solution used in reduction is an aqueous solution containing $NaBH_4$ or $LiBH_4$ in an amount of 20-40 mmol.

The present disclosure further provides use of a bismuth nanosheet, a supported bismuth nanosheet, or a bismuth alloy nanosheet prepared by the above preparation methods for an efficient electrocatalytic reduction of carbon dioxide.

The present disclosure has the following advantageous effects.

(1) The methods for synthesizing metal bismuth (Bi) thin sheet known in the prior art mostly utilize electrochemical deposition or electrochemical reduction methods, and are difficult to obtain a bismuth nanosheet with a single atom layer thickness. The present disclosure for the first time proposes to directly prepare such an atomic-scale bismuth nanosheet through an aqueous solution reduction method. The present application for the first time obtains a monatomic-scale bismuth nanosheet with a thickness of only 0.7 nm by using ethylene glycol ethyl ether as a solvent and using a highly reductive aqueous solution containing $NaBH_4$, $LiBH_4$ or the like at a certain concentration as a reducing agent, under a protection atmosphere of an inert gas. At the same time, bismuth nanosheets with different thicknesses can be prepared by varying experiment conditions, to achieve an adjustable thickness.

(2) The bismuth nanosheet with a single atom layer thickness prepared by the preparation method provided in the present disclosure exhibits an excellent $CO_2$ catalytic reduction property. In the case of a 330 mV overpotential, the Faradic efficiency of catalyzing $CO_2$ to produce formic acid can reach 98%, the initial overpotential is as low as 80 mV, and the stability lasts for as long as 75 h. Moreover, there are no other by-products. Many problems confronted by the bismuth-based catalyst are ameliorated, and the relatively low overpotential and ultrahigh stability thereof are also superior to most of catalysts of same type. Also, the correlation between the bismuth nanosheets having different thicknesses and their performances on the electrocatalytic reduction of $CO_2$ to produce formic acid is studied.

(3) The preparation method provided in the present disclosure is simple in process and environmental friendly. The whole process is conducted under normal temperature and pressure. The bismuth nanosheet prepared may also be supported on a carrier. The carrier used belongs to carbon materials and is inexpensive and easily available. The bismuth nanosheet prepared may also be alloyed to prepare a bismuth alloy nanosheet, and a higher catalytic property can still be maintained after complexation the bismuth nanosheet with a carbon-based carrier and alloying the bismuth nanosheet. In addition, the electrolyte is a common salt solution without addition of any organics.

(4) The formic acid produced from the electrocatalytic reduction of $CO_2$ with the bismuth nanosheet prepared by the preparation method provided in the present disclosure can be used as preservative and antimicrobial in leather tanning, or can be directly made into a promising formic acid fuel cell, which is a good way to recycle $CO_2$.

BRIEF DESCRIPTION OF DRAWINGS

The present disclosure is further described in detail below with reference to the drawings and the particular embodiments.

DETAILED DESCRIPTION

The present disclosure is described in detail below with reference to the drawings.

The present disclosure provides a method for preparing a thickness-controllable bismuth nanosheet, comprising the steps of:

dissolving a bismuth salt compound as a raw material in ethylene glycol ethyl ether as a solvent, and performing a reduction through an aqueous solution reduction method to obtain the bismuth nanosheet.

A specific embodiment of the method for preparing a thickness-controllable bismuth nanosheet comprises the steps of:

adding 0.5 mmol to 5 mmol of bismuth salt compound into 200-300 mL of ethylene glycol ethyl ether, stirring with sonication to homogenization until a clear solution is obtained, subsequently stirring the solution at 25-120° C. for 30-60 min, under a protection of an inert gas, cooling the resultant to ambient temperature, then adding an aqueous reducing solution containing 20-40 mmol of $NaBH_4$ or $LiBH_4$ dropwise thereto under an inert gas atmosphere, and stirring for another 15-30 min, and after completion of the reaction, allowing the reaction product to be sonicated, filtered, washed with ethanol and water, collected, and dried, to obtain the bismuth nanosheet.

The bismuth nanosheet preferably has a thickness of 0.7 nm-50 nm, and more preferably has a thickness of 0.7 nm-4 nm. The bismuth salt compound is bismuth chloride or bismuth nitrate. The bismuth nanosheet prepared may also be supported on a carbon-based carrier, wherein the carbon-based carrier is GO, reduced GO, or carbon back such as BLACK PEARLS® 2000 (available from Asian-Pacific Specialty Chemicals Ltd, Kuala Lumpur, Malaysia) or VUL-CAN® XC-72 (available from CABOT Corporation, USA).

The present disclosure further provides a method for preparing a thickness-controllable bismuth alloy nanosheet, comprising the steps of:

dissolving a bismuth salt compound and a palladium, nickel, zinc, gold, or copper salt compound as raw materials in ethylene glycol ethyl ether as a solvent, and performing a reduction through an aqueous solution reduction method to obtain the bismuth alloy nanosheet.

A specific embodiment of the method for preparing a thickness-controllable bismuth alloy nanosheet comprises the steps of:

dissolving 0.5 mmol to 5 mmol of palladium, nickel, zinc, gold, or copper salt compound in 200-300 mL of ethylene glycol ethyl ether, stirring with sonication to homogenization, subsequently stirring the solution at 25-120° C. for 30-60 min, under a protection atmosphere of an inert gas, cooling the resultant to ambient temperature, then adding 0.5 mmol to 5 mmol of bismuth salt compound thereto, mixing and stirring the mixture to homogenization, then adding an aqueous reducing solution containing 20-40 mmol of $NaBH_4$ or $LiBH_4$ dropwise thereto under an inert gas atmosphere, and stirring for another 15-30 min, after completion of the reaction, allowing the reaction product to be filtered, washed with ethanol and water, collected, and dried, placing the dried sample in a tube furnace into which hydrogen gas is injected, and calcinating the sample at 300-600° C. for 1-3 h, to obtain the bismuth alloy nanosheet.

The bismuth salt compound is bismuth chloride or bismuth nitrate.

The present disclosure further provides use a bismuth nanosheet, a supported bismuth nanosheet, or a bismuth alloy nanosheet prepared by the above preparation method for an efficient electrocatalytic reduction of carbon dioxide.

EXAMPLE 1

Preparation of a Bismuth Nanosheet Having a Thickness of 0.7 nm 0.5 mmol of bismuth chloride was added into 200 mL of ethylene glycol ethyl ether, and was stirred with sonication to homogenization until a clear solution was obtained. Subsequently, the solution was stirred at 25° C. for 30 min under a protection atmosphere of an inert gas. After the resultant was cooled to ambient temperature, an aqueous reducing solution containing 20 mmol of $NaBH_4$ was dropwise added thereto under an inert gas atmosphere and was stirred for another 15 min. After the reaction was completed, the reaction product was sonicated, filtered, washed with ethanol and water, collected, and dried, to obtain the bismuth nanosheet having a thickness of 0.7 nm.

Figure 1:
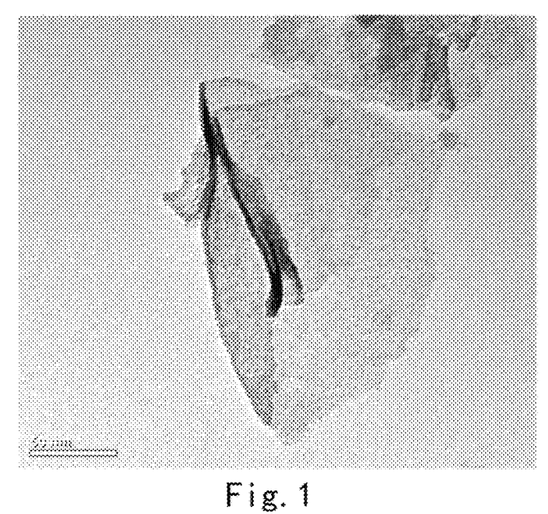
FIG. 1 is a transmission electron microscopy image of the bismuth nanosheet prepared in Example 1 in the present disclosure.

FIG. 1 is a transmission electron microscopy image of the bismuth nanosheet prepared in Example 1 in the present disclosure. It can be seen from this figure that the bismuth nanosheet prepared in this example exhibits an ultra-thin lamellar structure.

Figure 2:
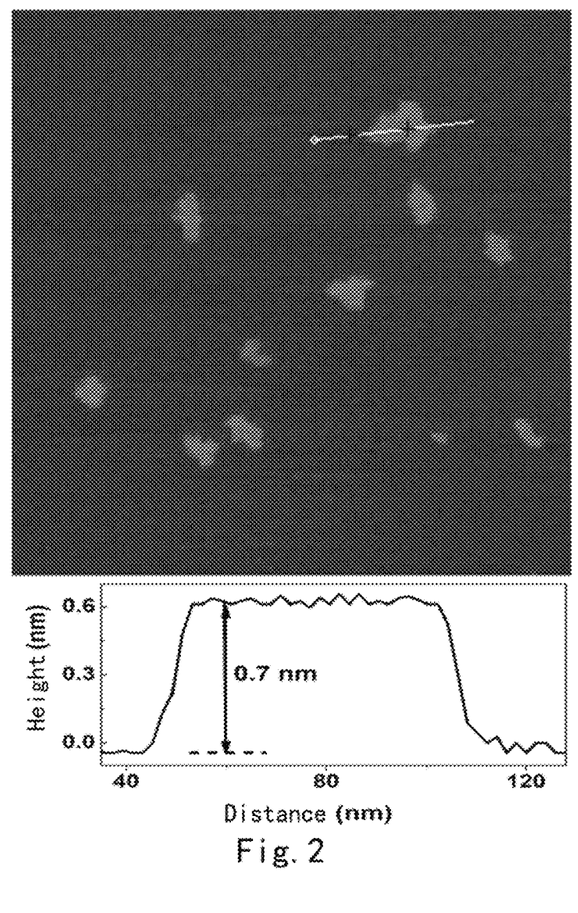
FIG. 2 is an atomic force microscopy image of the bismuth nanosheet prepared in Example 1 in the present disclosure.

FIG. 2 is an atomic force microscopy image of the bismuth nanosheet prepared in Example 1 in the present disclosure. It can be seen from this figure that its average thickness is 0.70 nm.

Figure 3:
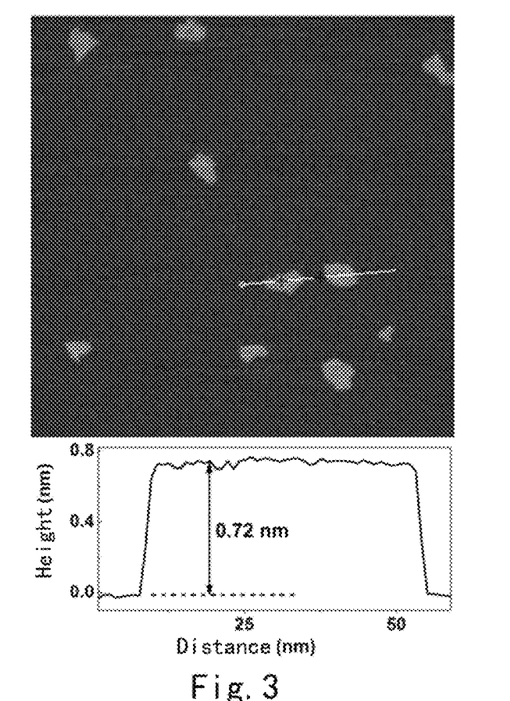
FIG. 3 is an atomic force microscopy image of the bismuth nanosheet prepared in Example 1 in the present disclosure after treating at a temperature of 300° C. for 4 h.

FIG. 3 is an atomic force microscopy image of the bismuth nanosheet prepared in Example 1 in the present disclosure after treating at a temperature of 300° C. for 4 h. It can be seen from this figure that its average thickness is 0.72 nm, substantially consistent with the thickness prior to the high temperature treatment.

Figure 5:
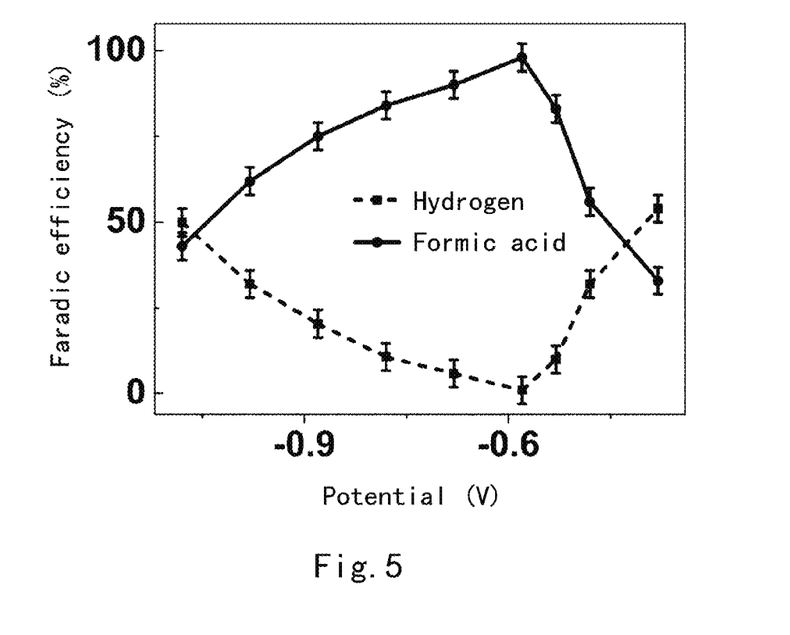
FIG. 5 is a Faradic efficiency graph for the reduction of $CO_2$ to formic acid at different potentials with the bismuth nanosheet prepared in Example 1 in the present disclosure.

FIG. 5 is a Faradic efficiency graph for the reduction of $CO_2$ to formic acid at different potentials with the bismuth nanosheet prepared in Example 1 in the present disclosure. It can be seen from this figure that when the potential is at −0.58 V, the Faradic efficiency for producing formic acid reaches 98% at most while it is merely less than 1% for hydrogen gas; and when the initial overpotential is only at 0.13 V, the Faradic efficiency for producing formic acid can still reach 33%.

Figure 10:
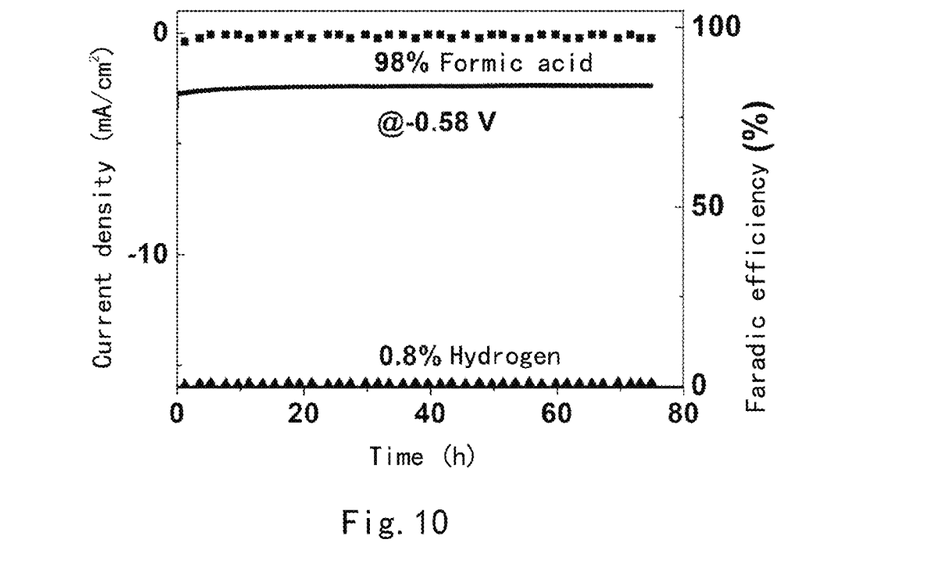
FIG. 10 is a current efficiency graph for the bismuth nanosheet prepared in Example 1 in the present disclosure operated at −0.58 V for 75 h.

FIG. 10 is a current efficiency graph for the bismuth nanosheet prepared in Example 1 in the present disclosure operated at −0.58 V for 75 h. It can be seen from this figure that during the 75 h operating period of the bismuth nanosheet catalyst, the current substantially does not show any attenuation, and the Faradic efficiency for producing formic acid remains unchanged and is 98%. This also demonstrates the ultrahigh stability of the bismuth nanosheet catalyst.

Figure 11:
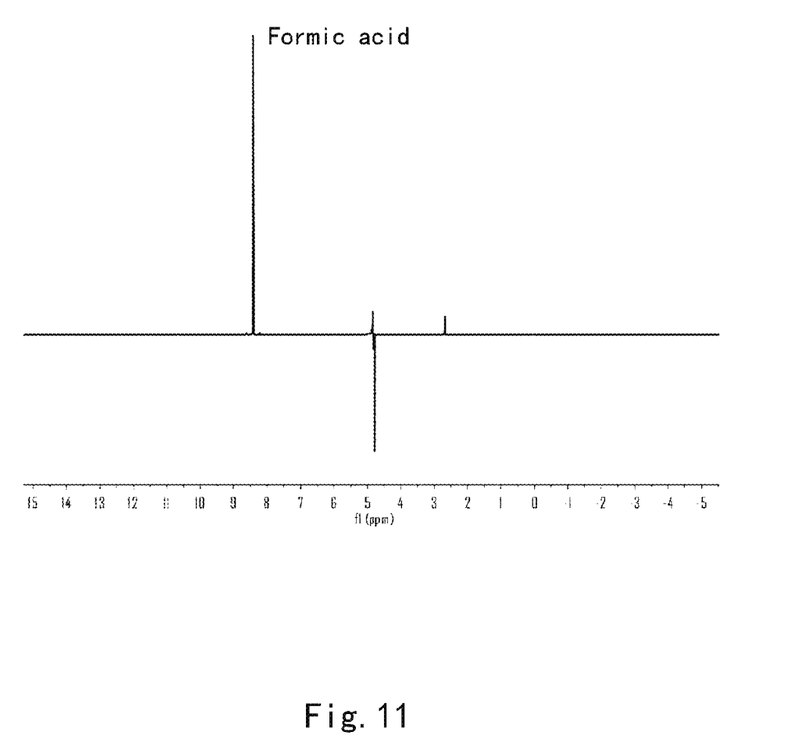
FIG. 11 is a nuclear magnetic detection spectrum for the catalytic reduction of $CO_2$ to produce formic acid at −0.58 V with the bismuth nanosheet prepared in Example 1 in the present disclosure.

FIG. 11 is a nuclear magnetic detection spectrum for the catalytic reduction of $CO_2$ to produce formic acid at −0.58 V with the bismuth nanosheet prepared in Example 1 in the present disclosure. This figure indicates that: as shown by the designation in the figure, formic acid is actually detected through the detection of H-NMR (AV 500) spectrum, and is quantified with DMSO as an internal standard.

EXAMPLE 2

Preparation of a Bismuth Nanosheet Having a Thickness of 4 nm 2.5 mmol of bismuth nitrate compound was added into 250 mL of ethylene glycol ethyl ether, and was stirred with sonication to homogenization until a clear solution was obtained. Subsequently, the solution was stirred at 70° C. for 45 min under a protection atmosphere of an inert gas. After the resultant was cooled to ambient temperature, an aqueous reducing solution containing 30 mmol of $LiBH_4$ was dropwise added thereto under an inert gas atmosphere and was stirred for another 20 min. After the reaction was completed, the reaction product was sonicated, filtered, washed with ethanol and water, collected, and dried, to obtain the bismuth nanosheet having a thickness of 4 nm.

Figure 4:
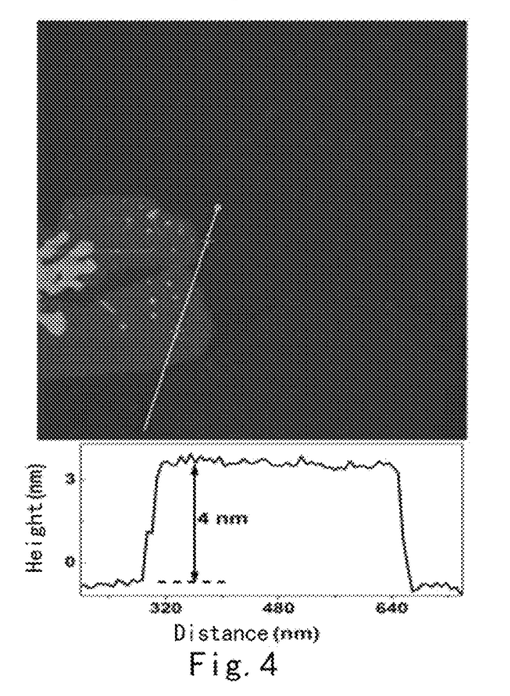
FIG. 4 is an atomic force microscopy image of the bismuth nanosheet prepared in Example 2 in the present disclosure.

FIG. 4 is an atomic force microscopy image of the bismuth nanosheet prepared in Example 2 in the present disclosure. It can be seen from this figure that the sheet of the bismuth nanosheet has a thickness of 4 nm.

EXAMPLE 3

Preparation of a Bismuth Nanosheet Having a Thickness of 13 nm 5 mmol of bismuth nitrate was added into 300 mL of ethylene glycol ethyl ether, and was stirred with sonication to homogenization until a clear solution was obtained.

Subsequently, the solution was stirred at 120° C. for 60 min under a protection atmosphere of an inert gas. After the resultant was cooled to ambient temperature, an aqueous reducing solution containing 40 mmol of NaBH$_4$ was dropwise added thereto under an inert gas atmosphere and was stirred for another 30 min. After the reaction was completed, the reaction product was sonicated, filtered, washed with ethanol and water, collected, and dried, to obtain the bismuth nanosheet having a thickness of 13 nm.

Carbon dioxide was electrocatalytically reduced to formic acid with the bismuth nanosheets prepared in the above Examples 1-3. In the process of the reduction, the potential during the constant potential reduction was controlled in a range of −0.38 V to −1.08 V (vs.RHE). The time for electroreduction was 75 h.

Figure 6:
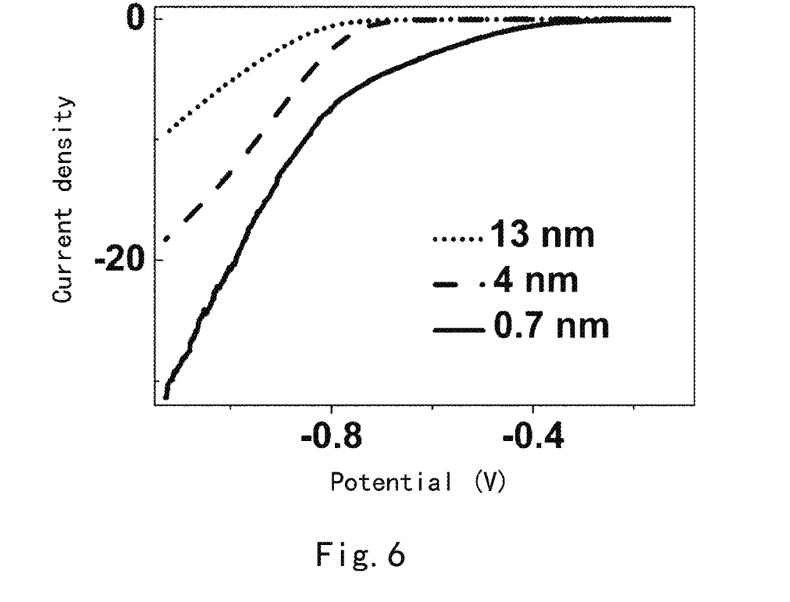
FIG. 6 is a comparison linear scanning voltammogram for the reduction of $CO_2$ with the bismuth nanosheets prepared in Examples 1, 2 and 3 in the present disclosure.

FIG. 6 is a comparison linear scanning voltammogram for the reduction of $CO_2$ with the bismuth nanosheets prepared in Examples 1, 2 and 3 in the present disclosure. This figure demonstrates that the bismuth nanosheets having different thicknesses have different responses to $CO_2$, and the less the thickness is, the larger the response is. The sheet having a thickness of 0.7 nm exhibits the largest current and the lowest initial potential.

Figure 9:
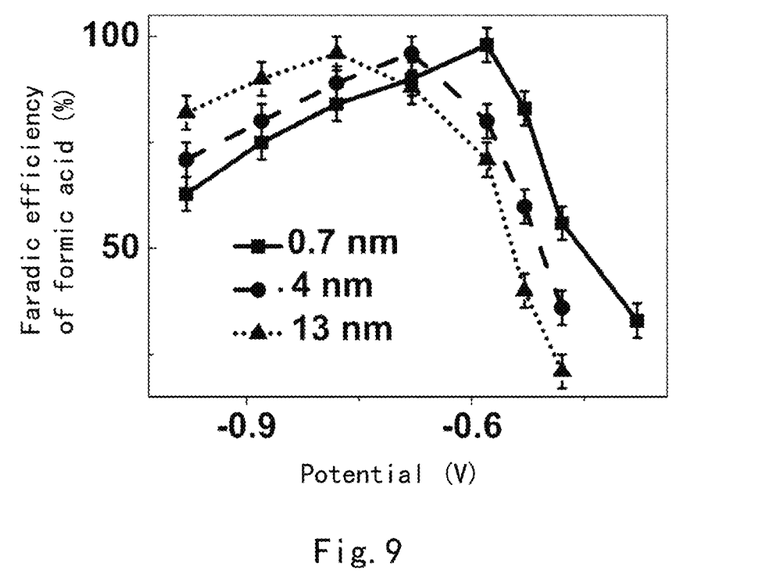
FIG. 9 is a comparison Faradic efficiency graph for the reduction of $CO_2$ to formic acid with the bismuth nanosheets prepared in Examples 1, 2, and 3 in the present disclosure.

FIG. 9 is a comparison Faradic efficiency graph for the reduction of $CO_2$ to formic acid with the bismuth nanosheets prepared in Examples 1, 2, and 3 in the present disclosure. It can be seen from this figure that the bismuth nanosheet having a thickness of 0.7 nm shows the best $CO_2$ reduction property. The peak overpotential (330 mV) of the bismuth nanosheet having a thickness of 0.7 nm is lower than those of the bismuth nanosheets having thicknesses of 4 nm (430 mV) and 13 nm (530 mV), and its Faradic efficiency for producing formic acid is also significantly higher than the other two bismuth nanosheets having different thicknesses. This further proves that the thinner the sheet of the bismuth nanosheet is, the better the $CO_2$ catalytic reduction property is.

EXAMPLE 4

The bismuth nanosheet having a thickness of 0.7 nm prepared in Example 1 was supported on GO to prepare a supported bismuth nanosheet.

Here, the GO may also be replaced with reduced GO, or carbon back such as BLACK PEARLS® 2000 or VULCAN® XC-72.

The bismuth nanosheet prepared in Example 1 can still maintain a relatively high catalytic property after complexation with a carbon-based carrier.

Figure 7:
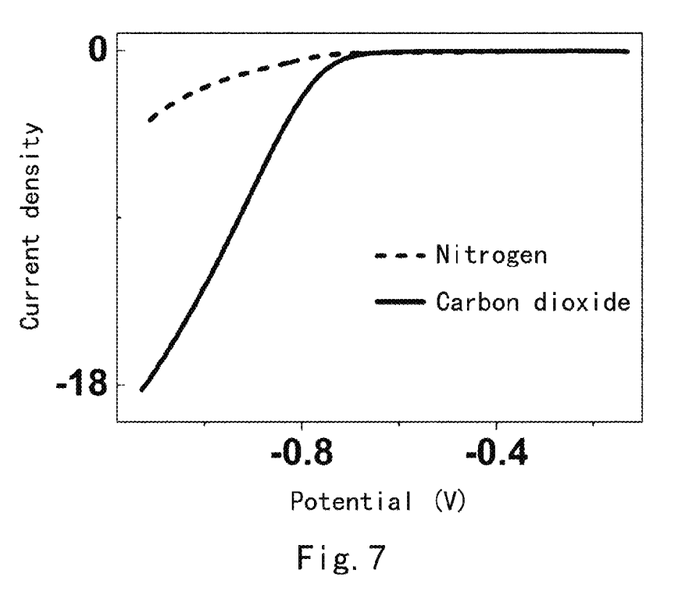
FIG. 7 is a linear scanning voltammogram for the reduction of $CO_2$ with the supported bismuth nanosheet prepared in Example 4 in the present disclosure.

FIG. 7 is a linear scanning voltammogram for the reduction of $CO_2$ with the supported bismuth nanosheet prepared in Example 4 in the present disclosure. It can be seen from this figure that the supported bismuth nanosheet has a larger response to $CO_2$.

EXAMPLE 5

Preparation of a Palladium-Bismuth Alloy Nanosheet 0.5 mmol of palladium chloride was dissolved in 200 mL of ethylene glycol ethyl ether, and was stirred with sonication to homogenization. Subsequently, the solution was stirred at 25° C. for 30 min under a protection atmosphere of an inert gas. After the resultant was cooled to ambient temperature, 0.5 mmol of bismuth chloride was added thereto, and was mixed and stirred to homogenization. Then, an aqueous reducing solution containing 20 mmol of NaBH$_4$ was dropwise added thereto under an inert gas atmosphere and was stirred for another 15 min. After the reaction was completed, the reaction product was filtered, washed with ethanol and water, collected, and dried. The dried sample was placed in a tube furnace into which hydrogen gas was injected, and calcinated at 300° C. for 1 h, to obtain the palladium-bismuth alloy nanosheet.

The palladium-bismuth alloy nanosheet prepared in Example 5 can still maintain a relative high catalytic property.

Figure 8:
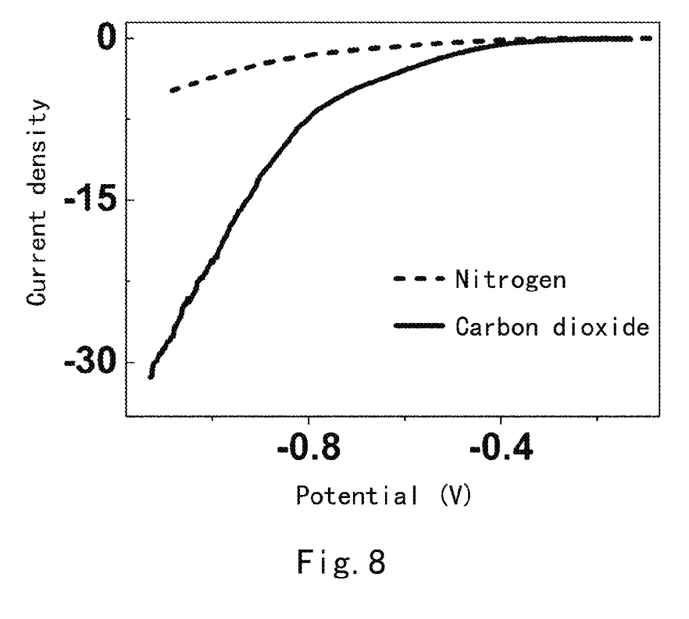
FIG. 8 is a linear scanning voltammogram for the reduction of $CO_2$ with the palladium-bismuth alloy nanosheet prepared in Example 5 in the present disclosure.

FIG. 8 is a linear scanning voltammogram for the reduction of $CO_2$ with the palladium-bismuth alloy nanosheet prepared in Example 5 in the present disclosure. It can be seen from this figure that the palladium-bismuth alloy nanosheet in a $CO_2$ saturated electrolyte exhibits a current and an initial potential both superior to those in a $N_2$ saturated electrolyte, demonstrating that the palladium-bismuth alloy nanosheet has a larger response to $CO_2$.

EXAMPLE 6

Preparation of a Nickel-Bismuth Alloy Nanosheet 5 mmol of nickel nitrate was dissolved in 300 mL of ethylene glycol ethyl ether, and was stirred with sonication to homogenization. Subsequently, the solution was stirred for 60 min at 120° C. under a protection atmosphere of an inert gas. After the resultant was cooled to ambient temperature, 5 mmol of bismuth nitrate was added thereto, and was mixed and stirred to homogenization. Then, an aqueous reducing solution containing 40 mmol of LiBH$_4$ was dropwise added thereto under an inert gas atmosphere and was stirred for another 30 min. After the reaction was completed, the reaction product was filtered, washed with ethanol and water, collected, and dried. The dried sample was placed in a tube furnace into which hydrogen gas was injected, and calcinated at 600° C. for 3 h, to obtain the nickel-bismuth alloy nanosheet.

The nickel nitrate in Example 6 was replaced with zinc nitrate, gold trichloride, or copper chloride to prepare zinc-bismuth alloy nanosheet, gold-bismuth alloy nanosheet, or copper-bismuth alloy nanosheet respectively.

The nickel-bismuth alloy nanosheet prepared in Example 6 can still maintain a relatively high catalytic property.

It is apparent that the above examples are merely intended for illustration in order for a clear explanation, rather than limitation to the embodiments. Other variations or modifications of different forms can also be made by one of ordinary skill in the art on the basis of the above description. There is no need or no way to exhaustively recite all the embodiments. Obvious variations or modifications derived therefrom still fall within the protection scope of the present disclosure.

What is claimed is:

1. A method for preparing a bismuth-containing nanosheet, comprising the steps of:
    adding 0.5 mmol of bismuth salt compound as a raw material into 200 mL of ethylene glycol ethyl ether as a solvent, stirring with sonication to homogenization until a clear solution is obtained,
    subsequently stirring the solution at 25° C. for 30 min, under a protection of an inert gas,
    cooling the resultant to ambient temperature,
    then adding an aqueous reducing solution containing 20 mmol NaBH$_4$ dropwise thereto under an inert gas atmosphere, and stirring for another 15 min, and
    after completion of the reaction, allowing the reaction product to be sonicated, filtered, washed with ethanol and water, collected, and dried, to obtain the bismuth-containing nanosheet with a thickness of 0.7 nm.

2. The method according to claim 1,
wherein the raw material further comprises a palladium, nickel, zinc, gold, or copper salt compound, and
the bismuth-containing nanosheet is a bismuth alloy nanosheet.

3. A method, comprising reducing carbon dioxide in the presence of the bismuth-containing nanosheet prepared by the method of claim 1.

4. The method according to claim 1, wherein the bismuth-containing nanosheet is supported on a carbon-based carrier to form a supported bismuth-containing nanosheet, wherein the carbon-based carrier is GO, reduced GO, or carbon black.

5. A method, comprising reducing carbon dioxide in the presence of the supported bismuth-containing nanosheet prepared by the method of claim 4.

6. The method according to claim 2, wherein the bismuth salt compound is bismuth chloride or bismuth nitrate, and the palladium, nickel, zinc, gold, or copper salt compound has an amount of 0.5 mmol-5 mmol.

7. A method, comprising reducing carbon dioxide in the presence of the bismuth alloy nanosheet prepared by the method of claim 2.

* * * * *